(12) United States Patent
Schattel et al.

(10) Patent No.: US 12,731,331 B2
(45) Date of Patent: Sep. 8, 2026

(54) SYSTEMS AND METHODS FOR CREATING, UPDATING, AND SHARING NOVEL FILE STRUCTURES FOR PERSISTENT 3D OBJECT MODEL MARKUP INFORMATION

(71) Applicant: Apple Inc., Cupertino, CA (US)

(72) Inventors: David M. Schattel, Santa Clara, CA (US); Arun Rakesh Yoganandan, San Francisco, CA (US); Christopher L. Nolet, San Francisco, CA (US); David Lui, San Jose, CA (US); Reza Abbasian, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 158 days.

(21) Appl. No.: 18/694,574

(22) PCT Filed: Sep. 21, 2022

(86) PCT No.: PCT/US2022/044209
§ 371 (c)(1),
(2) Date: Mar. 22, 2024

(87) PCT Pub. No.: WO2023/049153
PCT Pub. Date: Mar. 30, 2023

(65) Prior Publication Data

US 2024/0394967 A1 Nov. 28, 2024

Related U.S. Application Data

(60) Provisional application No. 63/261,608, filed on Sep. 24, 2021.

(51) Int. Cl.
*G06T 17/00* (2006.01)
*G06T 11/23* (2026.01)

(52) U.S. Cl.
CPC .............. *G06T 17/00* (2013.01); *G06T 11/23* (2026.01)

(58) Field of Classification Search
None
See application file for complete search history.

(56) References Cited

U.S. PATENT DOCUMENTS

| | | | | |
|---|---|---|---|---|
| 5,526,478 | A * | 6/1996 | Russell, Jr. | G06T 19/00 715/202 |
| 2007/0014451 | A1 | 1/2007 | Dwyer | |
| 2008/0247636 | A1 | 10/2008 | Davis | |

OTHER PUBLICATIONS

Ding, et al., "The integration of lightweight representation and annotation for collaborative design representation," vol. 20, No. 3, Aug. 25, 2009, XP019735739, ISSN: 1435-6066, DOI: 10.1007/800163-009-0077-2.

(Continued)

*Primary Examiner* — Nurun Flora
(74) *Attorney, Agent, or Firm* — Blank Rome LLP

(57) ABSTRACT

Techniques are disclosed for rendering graphical content, e.g., in an extended reality (XR) environment, that provide for a creator (or recipient) of a 3D object markup file, e.g., a user operating an electronic device configured to be aware of the structure and organization of the 3D object markup file's format, to: create a 3D object markup file; reproduce a 3D object for display, along with its corresponding markup information; toggle the markup information on or off for display; and/or make further updates to such markup information with complete reproduction fidelity and accuracy. Techniques herein also provide for the sharing of 3D object markup files (including any persistent markup information) with other users, e.g., asynchronously or in real-time, allowing for collaboration in the process of marking up virtual 3D (Continued)

objects. The 3D object markup file may also be exported, such that the markups are no longer editable or toggleable for display.

20 Claims, 9 Drawing Sheets

(56) References Cited

OTHER PUBLICATIONS

International Search Report and Written Opinion of PCT Application No. PCT/US2022/044209, mailed Jan. 10, 2023.
Kim, et al., "Distributed Concurrent Engineering: Internet-Based Interactive 3-D Dynamic Browsing and Markup of STEP Data," Concurrent Engineering: Research and Applications, vol. 6, No. 1, Mar. 1, 1998, XP001040922, ISSN: 1063-293X.

* cited by examiner

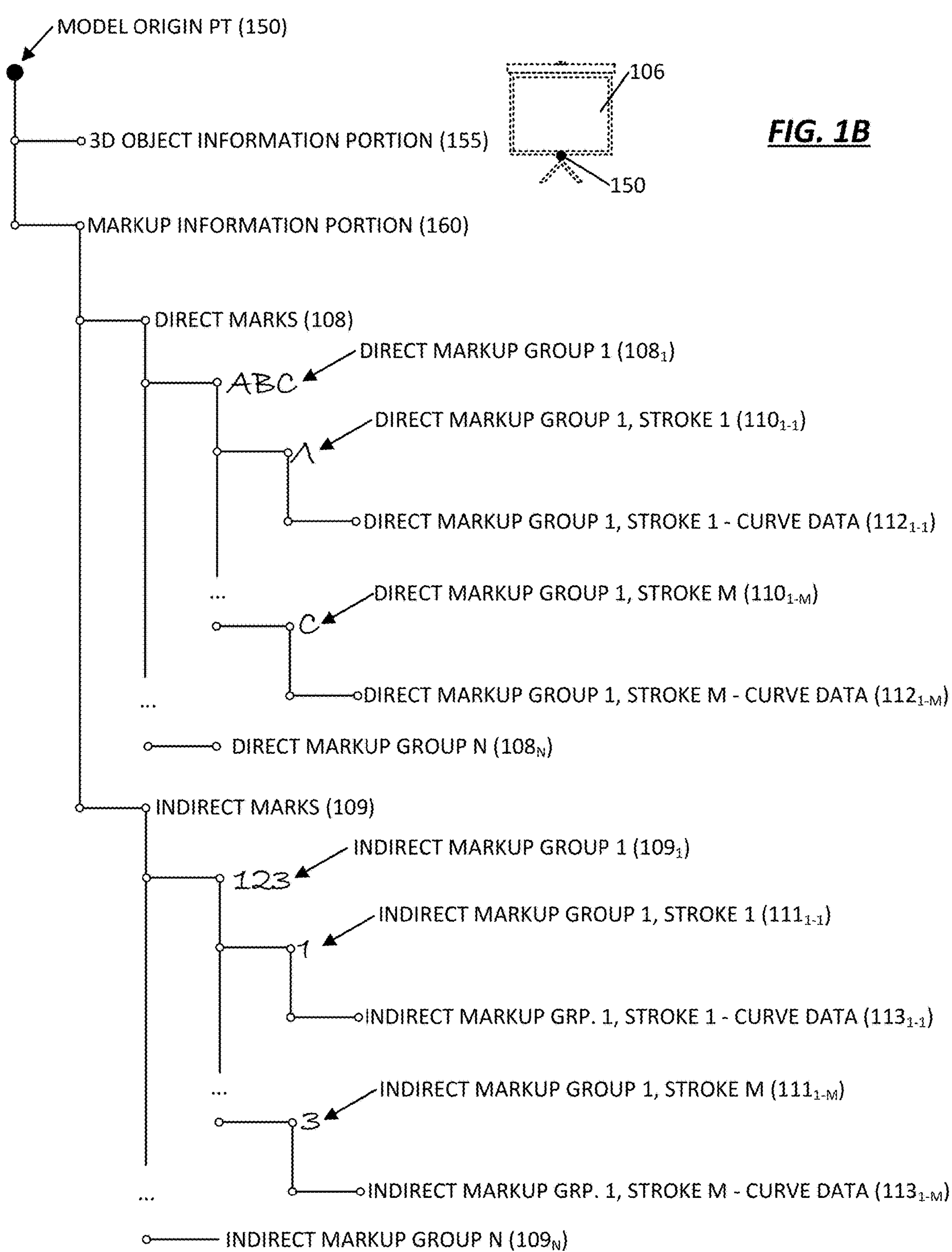
EXEMPLARY 3D OBJECT MARKUP FILE STRUCTURE (140)
MODEL ORIGIN PT (150)
3D OBJECT INFORMATION PORTION (155)
106
150
FIG. 1B
MARKUP INFORMATION PORTION (160)
DIRECT MARKS (108)
DIRECT MARKUP GROUP 1 ($108_1$)
ABC
DIRECT MARKUP GROUP 1, STROKE 1 ($110_{1-1}$)
DIRECT MARKUP GROUP 1, STROKE 1 - CURVE DATA ($112_{1-1}$)
...
DIRECT MARKUP GROUP 1, STROKE M ($110_{1-M}$)
C
DIRECT MARKUP GROUP 1, STROKE M - CURVE DATA ($112_{1-M}$)
...
DIRECT MARKUP GROUP N ($108_N$)
INDIRECT MARKS (109)
INDIRECT MARKUP GROUP 1 ($109_1$)
123
INDIRECT MARKUP GROUP 1, STROKE 1 ($111_{1-1}$)
1
INDIRECT MARKUP GRP. 1, STROKE 1 - CURVE DATA ($113_{1-1}$)
...
INDIRECT MARKUP GROUP 1, STROKE M ($111_{1-M}$)
3
INDIRECT MARKUP GRP. 1, STROKE M - CURVE DATA ($113_{1-M}$)
...
INDIRECT MARKUP GROUP N ($109_N$)

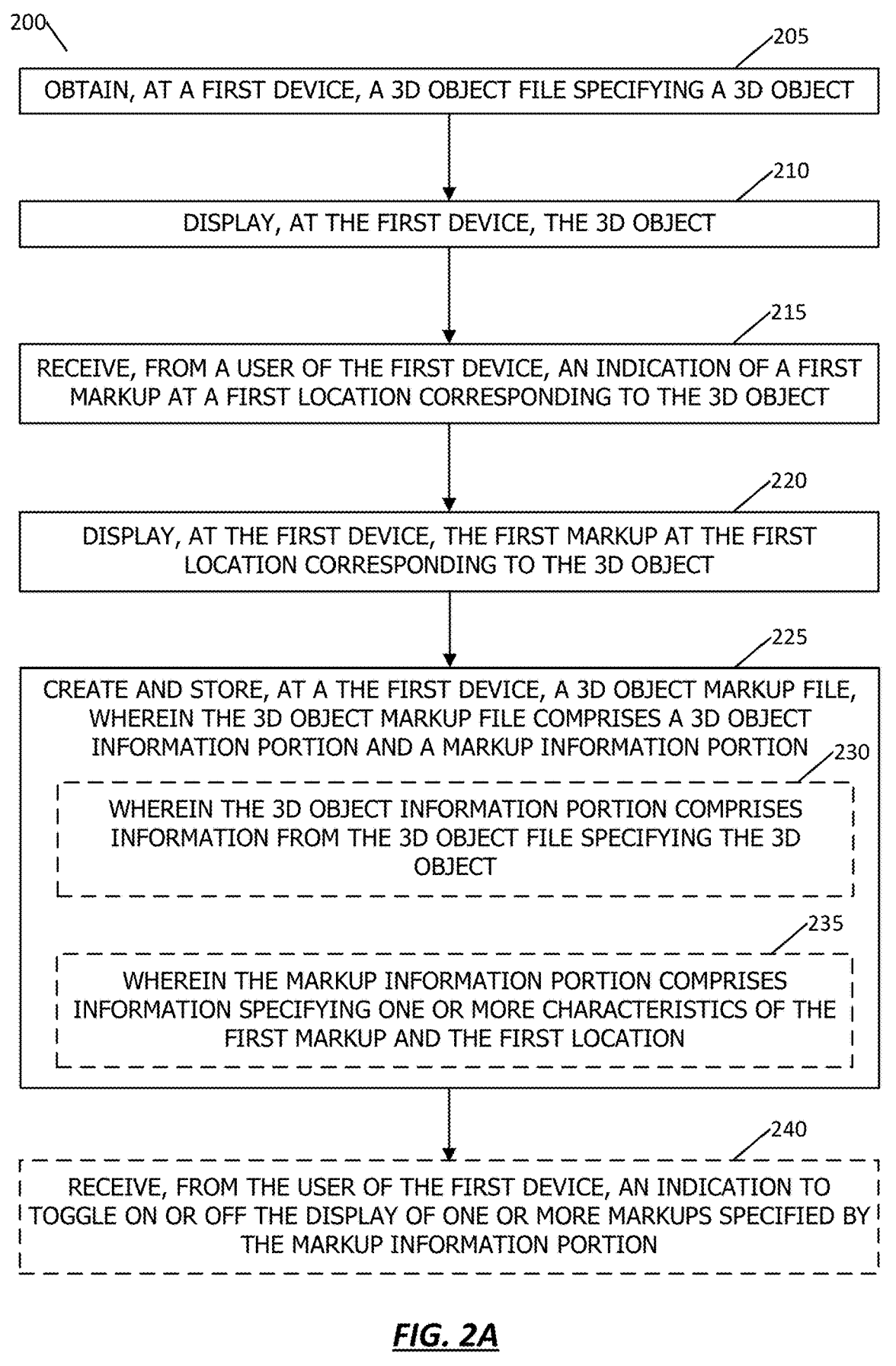

200

205 OBTAIN, AT A FIRST DEVICE, A 3D OBJECT FILE SPECIFYING A 3D OBJECT

210 DISPLAY, AT THE FIRST DEVICE, THE 3D OBJECT

215 RECEIVE, FROM A USER OF THE FIRST DEVICE, AN INDICATION OF A FIRST MARKUP AT A FIRST LOCATION CORRESPONDING TO THE 3D OBJECT

220 DISPLAY, AT THE FIRST DEVICE, THE FIRST MARKUP AT THE FIRST LOCATION CORRESPONDING TO THE 3D OBJECT

225 CREATE AND STORE, AT A THE FIRST DEVICE, A 3D OBJECT MARKUP FILE, WHEREIN THE 3D OBJECT MARKUP FILE COMPRISES A 3D OBJECT INFORMATION PORTION AND A MARKUP INFORMATION PORTION

230 WHEREIN THE 3D OBJECT INFORMATION PORTION COMPRISES INFORMATION FROM THE 3D OBJECT FILE SPECIFYING THE 3D OBJECT

235 WHEREIN THE MARKUP INFORMATION PORTION COMPRISES INFORMATION SPECIFYING ONE OR MORE CHARACTERISTICS OF THE FIRST MARKUP AND THE FIRST LOCATION

240 RECEIVE, FROM THE USER OF THE FIRST DEVICE, AN INDICATION TO TOGGLE ON OR OFF THE DISPLAY OF ONE OR MORE MARKUPS SPECIFIED BY THE MARKUP INFORMATION PORTION

*FIG. 2A*

SYSTEMS AND METHODS FOR CREATING, UPDATING, AND SHARING NOVEL FILE STRUCTURES FOR PERSISTENT 3D OBJECT MODEL MARKUP INFORMATION

This disclosure relates generally to three-dimensional (3D) graphics processing techniques. More particularly, but not by way of limitation, this disclosure relates to systems, methods, and computer readable media for creating novel file structures to store 3D object information and corresponding markup information in a persistent fashion.

Some electronic devices are capable of generating and presenting so-called extended reality (XR) environments. An XR environment may include a wholly- or partially-simulated environment, including one or more virtual 3D objects, which users of such electronic devices can sense and/or interact with. In XR, a subset of a person's physical motions, or representations thereof, may be tracked, and, in response, one or more characteristics of the one or more virtual objects simulated in the XR environment may be adjusted in a manner that comports with at least one law of physics, such as by adding, editing, or deleting "markups" or other annotations associated with such virtual objects.

BRIEF DESCRIPTION OF THE DRAWINGS

FIG. 1B shows an exemplary 3D object markup file structure, according to one or more embodiments.

FIGS. 2A-2C show flowcharts of techniques for creating and updating 3D object markup files, according to one or more embodiments.

DETAILED DESCRIPTION

Figure 1A:
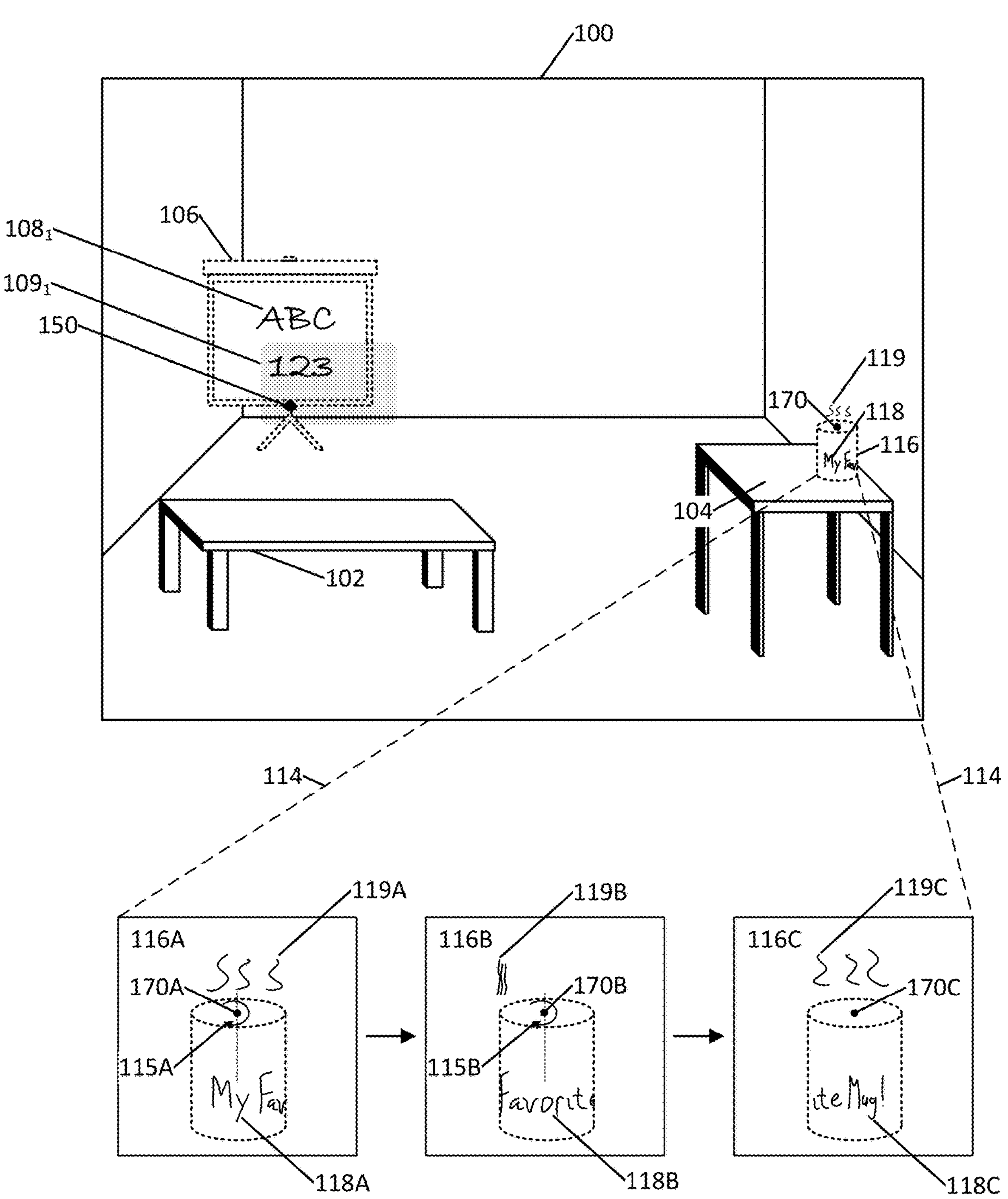
FIG. 1A shows a diagram of an example extended reality (XR) operating environment, according to one or more embodiments.

In some cases, the user of an electronic device capable of generating and presenting XR environments may desire to markup one or more virtual 3D objects (e.g., by providing one or more annotations, alterations, or updates to the virtual 3D object). A user may then wish to, e.g., send a marked up virtual object to another user, receive a marked up virtual object from another user, display a marked up virtual object, collaborate with another user in marking up a virtual object, or otherwise interact a marked up virtual object within an XR environment. To date, current digital content creation (DCC)-compatible file formats for 3D objects, e.g., the Universal Scene Description (USD) format created by PIXAR® (PIXAR is a registered trademark of Pixar Corp. California), are used to exchange 3D graphical data between users of different systems, but they do not provide the capability to store corresponding persistent markup information alongside the 3D graphical data.

Thus, what is needed are improved techniques for rendering graphical content in an XR environment that provide for a creator (or recipient) of a 3D object markup file, e.g., whose system is aware of the structure and organization of the 3D object markup file format, to, e.g.: create a 3D object markup file; reproduce a 3D object for display, along with its corresponding markup information; toggle the markup information on or off for display; and/or make further updates to such markup information with complete reproduction fidelity and accuracy—as well as to share the 3D object markup file (including any such persistent markup information) with other users, e.g., asynchronously or in real-time.

As such, this disclosure pertains to systems, methods, and computer readable media to create, update, and/or utilize novel 3D object markup file formats for storing persistent markup information in conjunction with corresponding 3D object information. In some embodiments, the techniques described herein provide a 3D object graphical markup method, comprising: obtaining, at a first device, a 3D object file specifying a 3D object; displaying, at the first device, the 3D object; receiving, from a user of the first device, an indication of a first markup at a first location corresponding to the 3D object; displaying, at the first device, the first markup at the first location corresponding to the 3D object; creating, at the first device, a 3D object markup file, wherein the 3D object markup file comprises a 3D object information portion and a markup information portion, wherein the 3D object information portion comprises information from the 3D object file specifying the 3D object, and wherein the markup information portion comprises information specifying one or more characteristics of the first markup and the first location. Once the 3D object markup file has been created, indications of additional markups to the 3D object may also be received and displayed at the first device, while the 3D object markup file may be updated appropriately, based on the additional markups received. Each individual markup (or groups of markups) may be toggled on or off for display by a user, as is desired.

In some embodiments, the 3D object markup file may comprise a hierarchical file structure, wherein the 3D object information is stored under a 3D object information node within the hierarchical file structure, and wherein the markup information is stored under a markup information node (i.e., a distinct node) within the hierarchical file structure.

In some embodiments, the markup information portion may further comprise a first group of strokes stored as a node under the markup information node in the 3D object markup file. In some such cases, the first group of strokes may comprise two or more individual strokes, wherein each of the two or more individual strokes are stored as nodes under the first group of strokes node in the 3D object markup file.

As will be described in greater detail herein, the markup information portion may comprise one or more so-called "direct" marks and/or one or more so-called "indirect" marks. In some implementations, direct marks may be rendered to a display with at least one different characteristic than indirect marks (e.g., with indirect marks being projected onto a plane near the 3D object rather than directly on the object, or with a different stroke thickness, different opacity, different coloration, different line pattern, etc.). In some embodiments, the markup information portion of the 3D object markup file may further comprise metadata related to one or more of the markups corresponding to the 3D object (e.g., stroke shape, stroke thickness, stroke material, stroke style, line caps, or point thickness, etc.)

In some embodiments, each of the one or more markups associated with a corresponding virtual 3D object may comprise information specifying its location relative to a point on the virtual 3D object (e.g., a so-called "origin point" of the 3D object model), such that the markups may always be reproduced at the correct location within 3D-space, with respect to the virtual 3D object, no matter where the virtual 3D object is moved (e.g., within an XR environment) or how the virtual 3D object (or the corresponding markup information) may later be modified by a user.

In other embodiments, the 3D object information portion and the markup information portion of the 3D object markup file may be exported to a second digital content creation (DCC)-compatible file format, wherein, e.g., once exported, the markup information will be viewable but no longer editable—by a user in the second DCC-compatible file format.

In still other embodiments, the markup information (and/or the 3D object information portion) may independently be exported at a predetermined or specified time and then transmitted to a third party or network location, thereby enabling asynchronous collaboration on 3D object markup.

In yet other embodiments, the markup information (and/or the 3D object information portion) may independently be exported in response to an update to the markup information portion (and/or the 3D object information portion, respectively) of the 3D object markup file and then transmitted to a third party or network location, thereby enabling real-time collaboration on 3D object markup.

The techniques disclosed herein may improve the performance of electronic devices rendering virtual 3D objects or other graphical content, e.g., in an XR environment, by allowing for the creation, updating, and optional display of persistent 3D markup information corresponding to particular 3D model objects. By establishing a common file structure, a 3D object markup file may be used to collaborate in markup sessions with other users, while maintaining complete reproduction fidelity and accuracy of the markup information.

Exemplary Extended Reality (XR) Devices

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly- or partially-simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user, similarly to how such views and sounds would change in a physical environment. In another example, the XR system can detect movement of an electronic device that presents the XR environment (e.g., a mobile phone, tablet, laptop, wearable device, or the like) and adjust graphical content and/or auditory content presented to the user, again, similarly to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples includes: heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment.

A head mountable system may also have a transparent or translucent display, rather than an opaque display. The transparent or translucent display can have a medium through which light is directed to a user's eyes. The display may utilize various display technologies, such as ULEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies, can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, a multiuser communication session can include an XR environment in which two or more devices are participating, while a single user session refers to an XR environment in which only one device is participating.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming—but would nevertheless be a routine undertaking for those of ordinary skill in the design and implementation of graphics rendering systems, having the benefit of this disclosure.

Exemplary XR Operating Environments

FIG. 1A shows a diagram of an example extended reality (XR) operating environment, according to one or more embodiments. While pertinent features are shown, those of ordinary skill in the art will appreciate, from the present disclosure, that various other features have not been illustrated for the sake of brevity- and so as not to obscure more pertinent aspects of the example among the implementations disclosed herein. To that end, as a nonlimiting example, the operating environment 100 includes a first physical environment, whereas other operating environments could include a completely different physical environment.

As shown in FIG. 1A, the first environment 100 includes different types of physical objects. As described above, the first environment 100 may be projected onto a display of one or more XR-enabled systems. In one or more embodiments, the display of the XR-enabled system may be a passthrough display (i.e., a an opaque display, which reproduces some or all of the physical objects in the device's environment, e.g., by capturing them with outward-facing cameras), and a view of physical tables 102 and 104 in the first environment 100 may simply be reproduced at the appropriate place on the display.

In other embodiments, "virtual" versions of physical tables 102 and 104 may be rendered at the appropriate place on the display, e.g., allowing a user adjust the appearance of such virtual objects by experimenting with what different materials, colors, sizes, etc. of the physical tables in the first environment 100 may look like.

In still other embodiments, the first environment 100 may further include different types of purely virtual objects, e.g., objects that are not actually physically present in the environment. In the first environment 100, virtual whiteboard 106 and virtual coffee mug 116 represent examples of purely virtual 3D objects in the first environment (as further indicated by the use of dashed lines for the edges of virtual whiteboard 106 and virtual coffee mug 116). As depicted, virtual coffee mug 116 is interacting with physical table 104 (i.e., it has been "placed on" physical table 104 in the displayed version of the first environment 100), while virtual whiteboard 106 has been placed near a back or "far" wall of the first environment 100.

Also illustrated in FIG. 1A are various exemplary markup annotations (i.e., $\mathbf{108_1}$/$\mathbf{109_1}$/181/119) corresponding to either the virtual 3D objects of the virtual whiteboard 106 or the virtual coffee mug 116. For example, these exemplary markups may have been made by the user operating the electronic device rendering the first XR environment 100, or they may have been made by a different user. The exemplary markups may have been made during a current XR session, or they may have been made during a previous XR session. In some embodiments, markup information may be represented in the form of individual line segments, around which a "mesh" of 3D vertices may be drawn, essentially creating a "tube" in 3D-space around the path of the markup being made by a user. It is to be understood that the exemplary markup annotations depicted in FIG. 1A are merely exemplary of the many types, sizes, and placements of markups that may comprise the markup information being displayed in a given XR environment.

As mentioned above, in some embodiments, the markup information may comprise direct marks (such as marks $\mathbf{108_1}$/118/119) and/or indirect marks (such as mark $\mathbf{109_1}$). In some embodiments, direct marks may be defined as markups to a 3D model made by a user directly at the location of their fingertips, cursor, stylus, or other input device in 3D-space, and indirect marks may be defined as markups to a 3D model made by a user indirectly, e.g., at a location in 3D-space that is inferred by the electronic device rendering the XR environment, e.g., from a user's gaze, a particular gesture being made by the user, a current context of the user's interactions with the XR environment, etc.

In the case of direct marks, a user may either "walk up" to a virtual 3D object (such as virtual whiteboard 106) or "pick up" a virtual 3D object (such as virtual coffee mug 116) and then place their virtual markup instrument (e.g., fingertips, cursor, stylus, etc.) directly onto the virtual surface of the virtual 3D object (or as close to the virtual 3D object's surface as they desire) and then begin making markup annotations to the virtual 3D object. In some embodiments, each mark (or group of marks) may be associated with a location in 3D-space relative to the particular virtual 3D object that it is marking up. In some cases, the location of the markups may be specified relative to a point on the virtual 3D object, e.g., a so-called "original point" of the virtual 3D object. As illustrated in FIG. 1A, virtual whiteboard 106 has an origin point 150 defined, and virtual coffee mug 116 has an origin point 170 defined. Thus, in the case of virtual whiteboard 106, the locations of exemplary direct markup group $\mathbf{108_1}$ (i.e., the marked up letters 'ABC') and exemplary indirect markup group $\mathbf{109_1}$ (i.e., the marked up numbers '123') in 3D-space may each be defined relative to origin point 150. In this way, in the event that virtual whiteboard 106 is moved around first environment 100, placed into a different XR environment, used or updated by another user, etc., the locations of the markups relative to the virtual whiteboard 106 remain persistent (and consistent to how they are shown as being rendered in FIG. 1A).

In some embodiments, indirect marks (e.g., markup group $\mathbf{109_1}$, i.e., the marked up numbers '123' in FIG. 1A) may be rendered with at least one different visual characteristic than direct marks, such as such by applying a degree of transparency to the indirect markup, changing a color of the indirect markup, changing a stroke thickness of the indirect markup, and/or projecting the indirect markup onto a virtual plane in 3D-space relative to the corresponding virtual 3D object that the user is marking up. In embodiments wherein indirect marks are displayed as being projected onto a virtual plane relative to their corresponding virtual 3D object, other visual indications (e.g., an outline or shape) of the virtual plane that the indirect markup is projected onto may also be used when the particular indirect markup is currently being displayed in the XR environment by a user.

For example, in the case of markup group $\mathbf{109_1}$, i.e., the marked up numbers '123' in FIG. 1A, the numbers '123' are shown a being projected onto a light gray virtual plane that may be depicted as 'hovering' in the XR environment somewhere in relation to virtual whiteboard 106 (e.g., in front of virtual whiteboard 106, above virtual whiteboard 106, etc.). In this way, as the user moves themselves (or their viewpoint) about the first environment 100, it may become apparent which markups are direct marks (e.g., the 'ABC' markup group $108_1$), which would remain positioned on the virtual surface of virtual whiteboard 106) and which markups are indirect marks (e.g., the '123' markup group $109_1$) which may gradually fade out (e.g., become more transparent) as a user moves themselves (or their viewpoint) around in the first environment 100 away from the orientation in which the indirect marks were originally made by the user. As mentioned above, because the precise location of indirect marks in 3D-space may be inferred (e.g., from a user's gaze position), i.e., rather than being explicitly indicated by the user (e.g., by indicating precisely in 3D-space where the markup is being made), this optional graphical implementation choice of fading out indirect marks as a user moves away from the original orientation in which the indirect marks were made may help the user to more easily distinguish between direct and indirect markups corresponding to a virtual 3D object model, as well as to limit the visual cluttering from markups within the XR environment.

Similarly, in the case of virtual coffee mug 116, the locations of exemplary direct markup group 118 (i.e., the words "My Favorite Mug!" written around the outer surface of the virtual coffee mug) and exemplary direct markup group 119 (i.e., the marked up "steam lines" drawn above the virtual coffee mug and aligned with the front-facing plane of the virtual coffee mug, as currently depicted in first environment 100) in 3D-space may each be defined relative to the virtual coffee mug 116's origin point 170. In this way, in the event that virtual coffee mug 116 is moved around first environment 100, placed into a different XR environment, used or updated by another user, etc., the locations of the markups relative to the virtual coffee mug 116 remain persistent (and consistent to how they are shown as being rendered in first environment 100 of FIG. 1A).

An example of the persistent nature of the markups is shown in the illustrative graphical example indicated by breakout lines 114 in FIG. 1A, wherein three exemplary rotated views of the virtual coffee mug 116 are shown. The first exemplary view of the virtual coffee mug, 116A, is a reproduction of the virtual coffee mug 116's current position in first environment 100. That is, in view 116A, the marked up letters "My Fav" (labeled 118A) on the outer surface of the virtual coffee mug 116 are currently visible, and the frontal surface of the marked up "steam lines" (labeled 119A) drawn above the virtual coffee mug 116 (and aligned with the front-facing plane of the virtual coffee mug 116) are also visible.

As mentioned above, in some embodiments, the location in 3D-space of each of the exemplary markups (e.g., 118/119) may be defined relative the origin point 170A. (In this example, origin point 170 for virtual coffee mug 116 is defined as being located in the center of the opening at the top of the mug, so it appears to be located consistently in each of the three exemplary rotated views of the virtual coffee mug 116, since it is being rotated around its central axis between the three exemplary rotated views 116A-116C (with arrow 115A indicating the rotation between view 116A and 116B and arrow 115B indicating the rotation between view 116B and 116C).

Turning now to the second exemplary view of the virtual coffee mug, 116B, the virtual coffee mug has been rotated around its central axis to the left by approximately 120 degrees. In view 116B, the marked up letters "Favorit" (labeled 118B) on the outer surface of the virtual coffee mug 116 are currently visible, and only a side surface of the marked up "steam lines" (labeled 119B) drawn above the virtual coffee mug 116 are visible, since the original front-facing plane of the virtual coffee mug from view 116A has now been rotated to be facing to the left in view 116B.

Finally, in the third exemplary view of the virtual coffee mug, 116C, the virtual coffee mug has been rotated around its central axis to the left by another approximately 120 degrees (i.e., relative to its position in view 116B). In view 116C, the marked up letters "ite Mug!" (labeled 118C) on the outer surface of the virtual coffee mug 116 are currently visible, and a view of the back side surface of the marked up "steam lines" (labeled 119C) drawn above the virtual coffee mug 116 are visible, since the original front-facing plane of the virtual coffee mug from view 116A has now been rotated to be facing to the back of first environment 100 in view 116C (Note: the steam lines 119C appear in a "mirrored" orientation as compared to the steam lines 119A in view 116A, since they are being viewed from an opposite side in view 119C and may optionally be made slightly more transparent to visually indicate that a non-frontal surface of the markup is currently being viewed.)

Similar to the discussion above regarding the display of indirect marks, if so desired in a given implementation (or if specified by a user), at least one different visual characteristic may be applied to a markup if there is a need to indicate that it is being viewed as a projection onto a virtual plane in 3D-space (i.e., rather than being viewed directly on the surface of a virtual 3D object), such as applying a degree of transparency to the markup, changing a color of the markup, changing a stroke thickness of the markup, providing a visual indication (e.g., an outline) of the virtual plane that the markup is projected onto when the markup is being displayed, etc. Such visual characteristics (such as illustrated with steam lines 119C) may help a user to distinguish whether they are viewing the original "front" of a markup, a "side view" of the original markup, a "back side" of the original markup, or even a "top" or "bottom" surface of the original markup.

FIG. 1B shows an exemplary 3D object markup file structure 140, according to one or more embodiments. As mentioned above, in some embodiments, the 3D object markup file structure 140 may comprise a hierarchical file structure, wherein the 3D object information is stored under a 3D object information node (e.g., 155) within the hierarchical file structure, and wherein the markup information is stored under a markup information node (e.g., 160) within the hierarchical file structure. In some cases, the 3D object information node 155 may simply store the information defining the 3D object model (in this case, virtual whiteboard 106) in a known 3D graphics interchange format, e.g., the aforementioned USD format. Thus, if the exemplary 3D object markup file structure 140 is received by an electronic system that is either unaware of the markup information portion (or not configured to know how to find, interpret, and render the markup information portion), it may at least be able to render the 3D object model (in this case, virtual whiteboard 106) in a standard fashion, i.e., without the added benefit of displaying it along with the corresponding persistent markup information. As also described above, the location of all 3D object information and/or markup information may be defined relative to an origin point (e.g., 150) of the 3D object model.

In some embodiments, the markup information portion 160 of the 3D object markup file 140 may be further divided into a direct marks portion (108) and an indirect marks portion (109). As described above, there may be occasions or implementations wherein it may be desirable that direct marks and indirect marks are displayed or otherwise treated in distinct and/or independent fashions. By grouping these different types of marks under separate nodes in the hierarchical file structure, it may be more efficient and convenient to apply visual treatments to such groups of marks independently.

In some such embodiments, the markup information for a given mark may further comprise a first group of strokes (e.g., direct markup group 1 108$_1$, i.e., the marked up letters 'ABC' in FIG. 1A), which may be stored as its own node under the markup information node 160 in the 3D object markup file 140, as illustrated by direct markup groups 108$_1$-108$_N$ in FIG. 1B. In some such cases, the first group of strokes may comprise two or more individual strokes (e.g., direct markup group 1, stroke 1 110$_{1-1}$, i.e., the first stroke input by the user when annotating the capital 'A' of direct markup group 108$_1$ on virtual 3D object 106). Each of the two or more individual strokes may then be stored as nodes under the first group of strokes node in the 3D object markup file (e.g., concluding with direct markup group 1, stroke M 110$_{1-M}$, i.e., the last stroke input by the user when annotating the capital 'C' of direct markup group 108$_1$ on virtual 3D object 106).

Moreover, information storing curve data (e.g., line segments, parameterized functions, etc.) defining each stroke making up each group of strokes in 3D object markup file 140 may also be stored under separate nodes in the hierarchical file structure. For example, direct markup group 1, stroke 1's curve data 112$_{1-1}$, i.e., the curve data defining the first stroke input by the user when annotating the capital 'A' of direct markup group 108$_1$ on virtual 3D object 106) may be stored under the node for direct markup group 1, stroke 1 110$_{1-1}$. As may be appreciated, storing the definition of each mark in the form of curve data in this manner may result in greater fidelity, reproducibility, and editing ability for the markup information than if each markup were 'baked' directly into the mesh data defining the 3D object mode, though certain embodiments may still provide the functionality to toggle on or off the markup information from display, even if baked into the 3D mesh of the virtual object file (e.g., by storing the markup portion of the mesh in a sibling node within the file structure).

As described above, in some such embodiments, the markup information for each indirect mark may further comprise a first group of strokes (e.g., indirect markup group 1 109$_1$, i.e., the marked up numbers '123' in FIG. 1A), which may be stored as its own node under the markup information node 160 in the 3D object markup file 140, as illustrated by indirect markup groups 109$_1$-109$_N$ in FIG. 1B. In some such cases, the first group of strokes may comprise two or more individual strokes (e.g., indirect markup group 1, stroke 1 111$_{1-1}$, i.e., the first stroke input by the user when annotating the number '1' of indirect markup group 109$_1$ corresponding to virtual 3D object 106). Each of the two or more individual strokes may then be stored as nodes under the first group of strokes node in the 3D object markup file (e.g., concluding with indirect markup group 1, stroke M 111$_{1-M}$, i.e., the last stroke input by the user when annotating the number '3' of direct markup group 109$_1$ on virtual 3D object 106). Similarly, information storing curve data defining each stroke making up each group of strokes in the indirect mark portion of 3D object markup file 140 may also be stored under separate nodes in the hierarchical file structure. For example, indirect markup group 1, stroke 1's curve data 113$_{1-1}$, i.e., the curve data defining the first stroke input by the user when annotating the number '1' of indirect markup group 109$_1$ on virtual 3D object 106) may be stored under the node for indirect markup group 1, stroke 1 111$_{1-1}$.

In some embodiments, a sequential ordering of the strokes made in the markups for a given virtual 3D object may also be stored within the 3D object markup file 140, thereby providing a viewing application the ability to later 'recreate' the markup strokes for a virtual 3D object in the same sequence (and optionally at the same rate) as they were originally made by the annotating user.

In some embodiments, various heuristics may be employed for determining when and where individual stroke groups should start and end (e.g., the stroke group 'A-B-C' in the example of direct markup group 1 108$_1$ or the stroke group '1-2-3' in the example of indirect markup group 1 109$_1$). For example, in the case of direct marks that are indicated by a user pinching two fingers together and moving around their pinched fingers in 3D-space, then the user slightly opening their fingers and then re-pinching them may indicate a new stroke that is part of the same group (e.g., the next letter in a word the user is marking up), while the user completely un-pinching their fingers and then re-pinching them at a substantially different location in 3D-space may indicate a new stroke group entirely (e.g., the next word in a sentence the user is marking up). Likewise, in the case of indirect marks, wherein the location of the indirect markings are inferred, e.g., by a measurement or detection of the user's gaze, then a new stroke group may be inferred any time the user substantially changes the position of their gaze within the XR environment (and/or completely un-pinches their fingers, as described in the direct mark example above), or whatever other heuristic may be most indicative of a user's desire to begin a new "group" of semantically- (or artistically-) related strokes that may be efficiently stored together under a common stroke group node in the 3D object markup file 140.

In some embodiments, a 3D object markup application executing on an electronic device may also track, in real-time, all edits, additions, deletions, etc., made to the markup information, such that users may be provided with familiar undo/redo, copy/paste, pixel erase, shape erase, etc., functionality when creating markup annotations. In some embodiments, the markup annotations being made by a user during a given session may be held in memory, while the 3D object markup file 140 hierarchy itself may only be updated at regular or aperiodic intervals (e.g., when explicitly directed by a user, such as via entry of a "Done Marking Up" or "Save Model" command), so as to reduce the amount of unnecessary and/or redundant changes being made to the 3D object markup file's structure.

FIG. 2A depicts a flowchart 200 of a technique for creating and updating 3D object markup files, according to one or more embodiments. For purposes of explanation, the flowchart may be described referencing example elements from FIGS. 1A and 1B. Although the flowchart shows various procedures performed by particular components in a particular order, it should be understood that according to one or more embodiments, the various processes may be performed by alternative devices or modules. In addition, the various processes may be performed in an alternative order, and various combinations of the processes may be performed simultaneously. Further, according to some embodiments, one or more of the processes may be omitted, or others may be added.

The flowchart 200 begins at block 205, where, a 3D object file specifying a 3D object may (e.g., such as exemplary 3D object markup file 140) be obtained at a first device. The flowchart 200 continues at block 210, wherein the 3D object may be displayed at the first device, e.g. in any suitable 3D object model viewer application or webpage. As described above, in some embodiments, the 3D object may be displayed in an XR environment. At block 215, the first device may receive, e.g., from a user of the first device, an indication of a first markup being made at a first location corresponding to the 3D object (e.g., such as the direct markup group $\mathbf{108}_1$ of the letters 'ABC' made on the virtual 3D whiteboard object 106, described above with reference to FIGS. 1A and 1B). In some embodiments, the first location may be defined relative to a point on the 3D object, e.g., a so-called "origin point" (e.g., such as origin point 150 described above with reference to virtual 3D whiteboard object 106). At block 220, the flow chart 200 may display, at the first device, the first markup at the first location corresponding to the 3D object.

At block 225, the first device may create (and, optionally, store in a memory) a 3D object markup file, wherein the 3D object markup file comprises a 3D object information portion and a markup information portion (e.g., as described above with reference to the exemplary 3D object markup file 140 of FIG. 1B). In some implementations, at block 230, the 3D object information portion may comprise information from the 3D object file specifying the 3D object (e.g., the virtual 3D whiteboard object 106). In some implementations, at block 235, the markup information portion may comprise information specifying one or more characteristics of the first markup and the first location (e.g., the direct markup group $\mathbf{108}_1$ and the indirect markup group $\mathbf{109}_1$). By storing the 3D object markup file in a persistent memory, it may later be accessed by the same user (or another user) and provide the ability to reproduce and view the same markups- and then subsequently edit or add additional markups to be stored in the 3D object markup file.

In some implementations, at block 240, the first device may receive, e.g., from the user of the first device, an indication to toggle on or off the display of one or more markups specified by the markup information portion. In this way, the markup information remains persistently associated with the 3D object and may be recalled for display if so desired, or else hidden from display, e.g., if the markup information (e.g., in the form of user annotations) would take up too much room in the user's field of view (FOV), or the user is otherwise unauthorized (or has no desire) to presently view the markup information corresponding to a given 3D object. As mentioned above, individual groups of marks (or types of marks) may also be independently toggled on or off for display, if so desired.

Figure 2B:
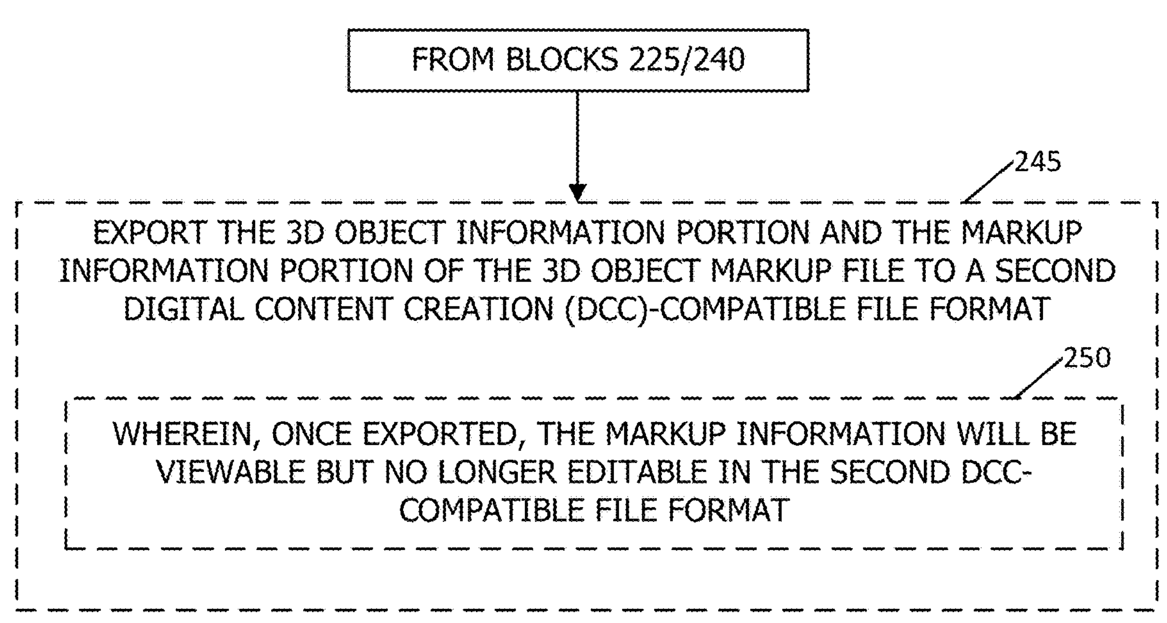

FIG. 2B depicts another technique for creating and updating 3D object markup files, according to one or more embodiments. Block 245, which may follow after block 225 or 240 from FIG. 2A, recites exporting the 3D object information portion and the markup information portion of the 3D object markup file to a second digital content creation (DCC)-compatible file format, e.g., the format may be USD or some other 3D graphics file format. In some implementations, e.g., as recited at block 250, once exported, the markup information will be viewable but no longer editable in the second DCC-compatible file format. In some embodiments, this may comprise "baking" the markups into a mesh of the 3D graphics file along with the 3D object model's mesh itself. In other words, the graphical information specifying the 3D object and the markups may be combined into a single file structure (e.g., rather than being stored in separate files). This type of embodiment allows a recipient system that is not programmed or configured to be aware of the structure and organization of the improved 3D object markup file format (such as those described herein) to still be able to experience and review the markups or other annotations corresponding to the 3D object—but with limited ability to edit, delete, or otherwise update the existing markup information.

Figure 2C:
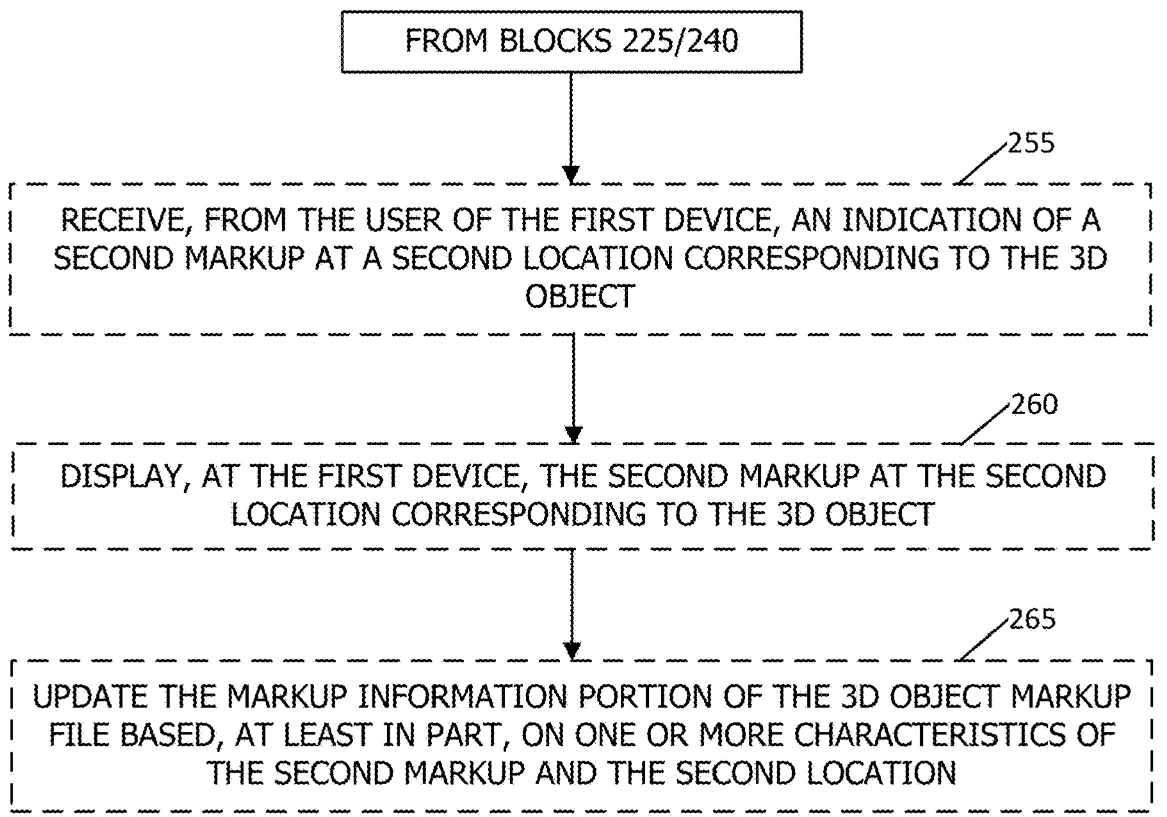

FIG. 2C depicts another technique for creating and updating 3D object markup files, according to one or more embodiments. Block 255, which may follow after block 225 or 240 from FIG. 2A, recites receiving, from the user of the first device, an indication of a second markup at a second location corresponding to the 3D object. At block 260, the first device may display the second markup at the second location corresponding to the 3D object, and, at block 265, the first device may update the markup information portion of a stored 3D object markup file based, at least in part, on one or more characteristics of the second markup and the second location. In other words, FIG. 2C addresses the scenario in which a 3D object markup file containing at least some markup information already exists, and a user updates at least the markup information portion of the 3D object markup file with an indication of a second (and/or additional) markup to the 3D object.

Figure 3A:
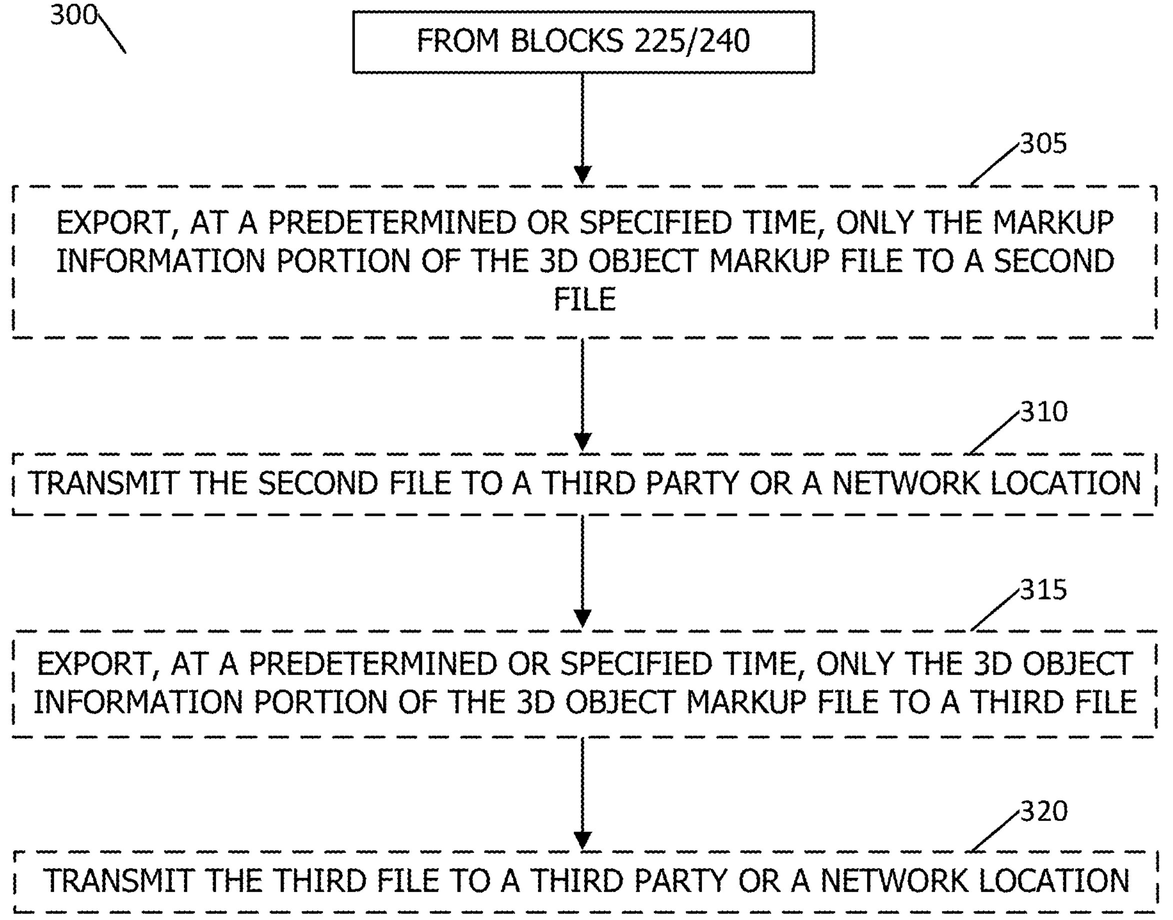
FIG. 3A-3B show flowcharts of techniques for collaborating in the creation and updating of 3D object markup files, according to one or more embodiments.

FIG. 3A depicts a flowchart 300 of a technique for collaborating in the creation and updating of 3D object markup files. Block 305, which may follow after block 225 or 240 from FIG. 2A, recites exporting, at a predetermined or specified time (e.g., every 5 minutes, after every time a user "saves" their markup annotations, etc.), only the markup information portion of the 3D object markup file to a second file. At block 310, the second file may be transmitted to a third party (i.e., sent directly to another user(s)) or a network location (i.e., sent or made available indirectly to another user(s)). At block 315, if so desired, the first device may proceed by exporting, at a predetermined or specified time, the 3D object information portion of the 3D object markup file to a third file. At block 320, if so desired, the third file may be transmitted to a third party or a network location. In other words, FIG. 3A addresses the scenario in which updates to a 3D object markup file are shared asynchronously for collaboration with another user(s). Moreover, FIG. 3A addresses the scenario where the markup information portion and the 3D object information portion of the 3D object markup file may each be exported and transmitted independently (e.g., in separate files from one another) and separately (e.g., at separate times) from one another, as is desired or needed by a given implementation. In some embodiments, it may be advantageous to limit the number of times the actual 3D object information portion itself is updated or transmitted between users or network locations, as it may have a substantially larger file size than the corresponding markup information portion of the 3D object markup file. However, it is to be understood that, in some embodiments, both the markup information portion and the 3D object information portion of the 3D object markup file may also be exported and transmitted together, i.e., as a single, complete markup file, if so desired.

Figure 3B:
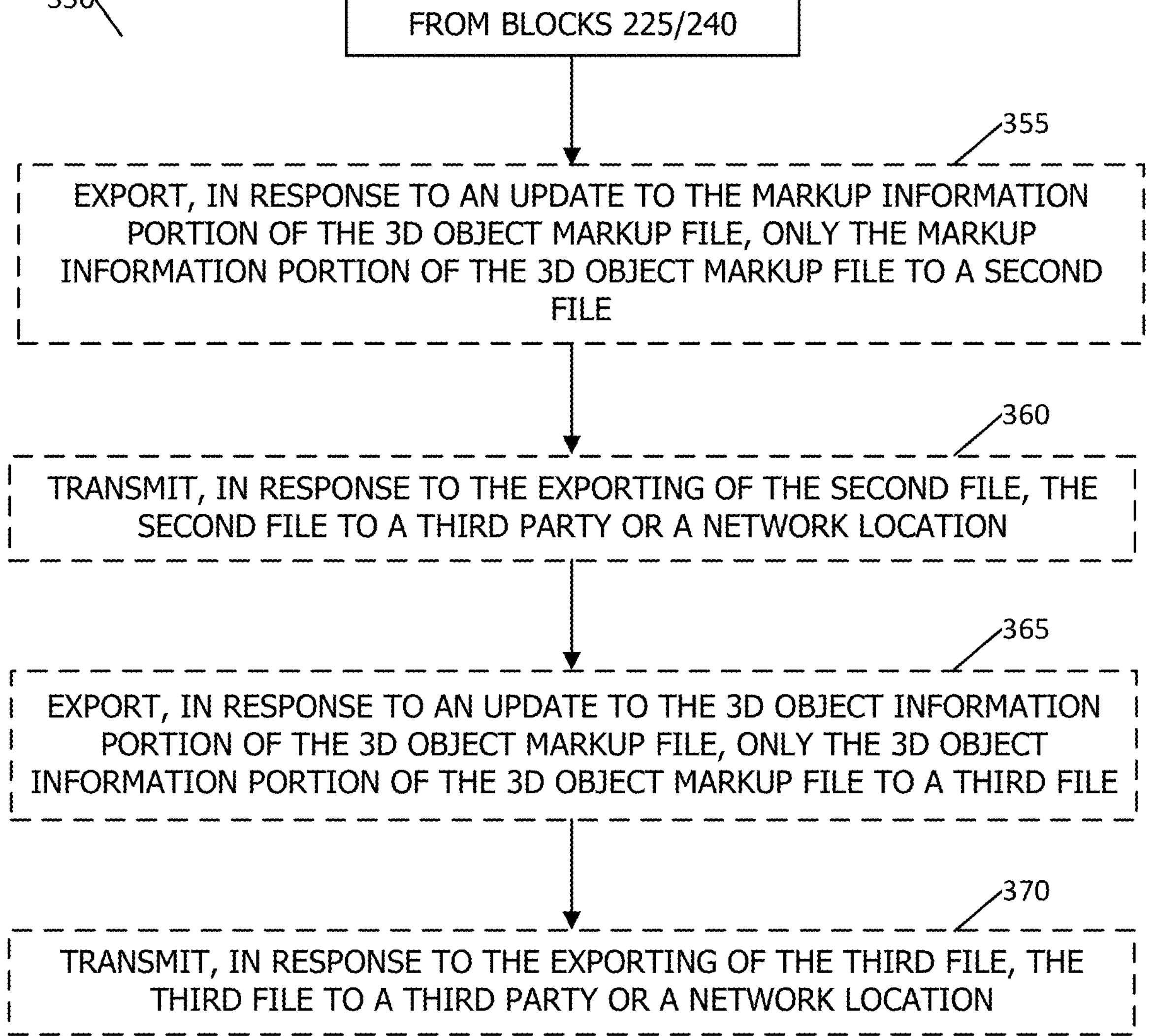

FIG. 3B depicts a flowchart 350 of another technique for collaborating in the creation and updating of 3D object markup files. Block 355, which may follow after block 225 or 240 from FIG. 2A, recites exporting, in response to an update to the markup information portion of the 3D object markup file, only the markup information portion of the 3D object markup file to a second file. At block 360, the second file may be transmitted to a third party or a network location. At block 365, if so desired, the first device may proceed by exporting, in response to an update to the 3D object information portion of the 3D object markup file, only the 3D object information portion of the 3D object markup file to a third file. At block 370, if so desired, the third file may be transmitted to a third party or a network location. In other words, FIG. 3B addresses the scenario in which a updates to a 3D object markup file are shared in "real-time," i.e., in response to each time an update is made to either the markup information and/or the 3D objection information, allowing for real-time collaboration with another user(s), such as in a "co-presence" scenario (e.g., a multiuser communication session), wherein two or more users may simultaneously be collaborating and/or marking up virtual 3D objects in the same XR environment at the same time. Moreover, FIG. 3B addresses the scenario where the markup information portion and the 3D object information portion of the 3D object markup file may each be exported and transmitted independently (e.g., in separate files from one another) from one another in response to updates being made to the respective portions of the 3D object markup file, as is desired or needed by a given implementation. However, as described above with reference to FIG. 3A, it is to be understood that, in some embodiments, both the markup information portion and the 3D object information portion of the 3D object markup file may also be exported and transmitted together, i.e., as a single, complete markup file, if so desired.

Exemplary Block Diagram

Figure 4:
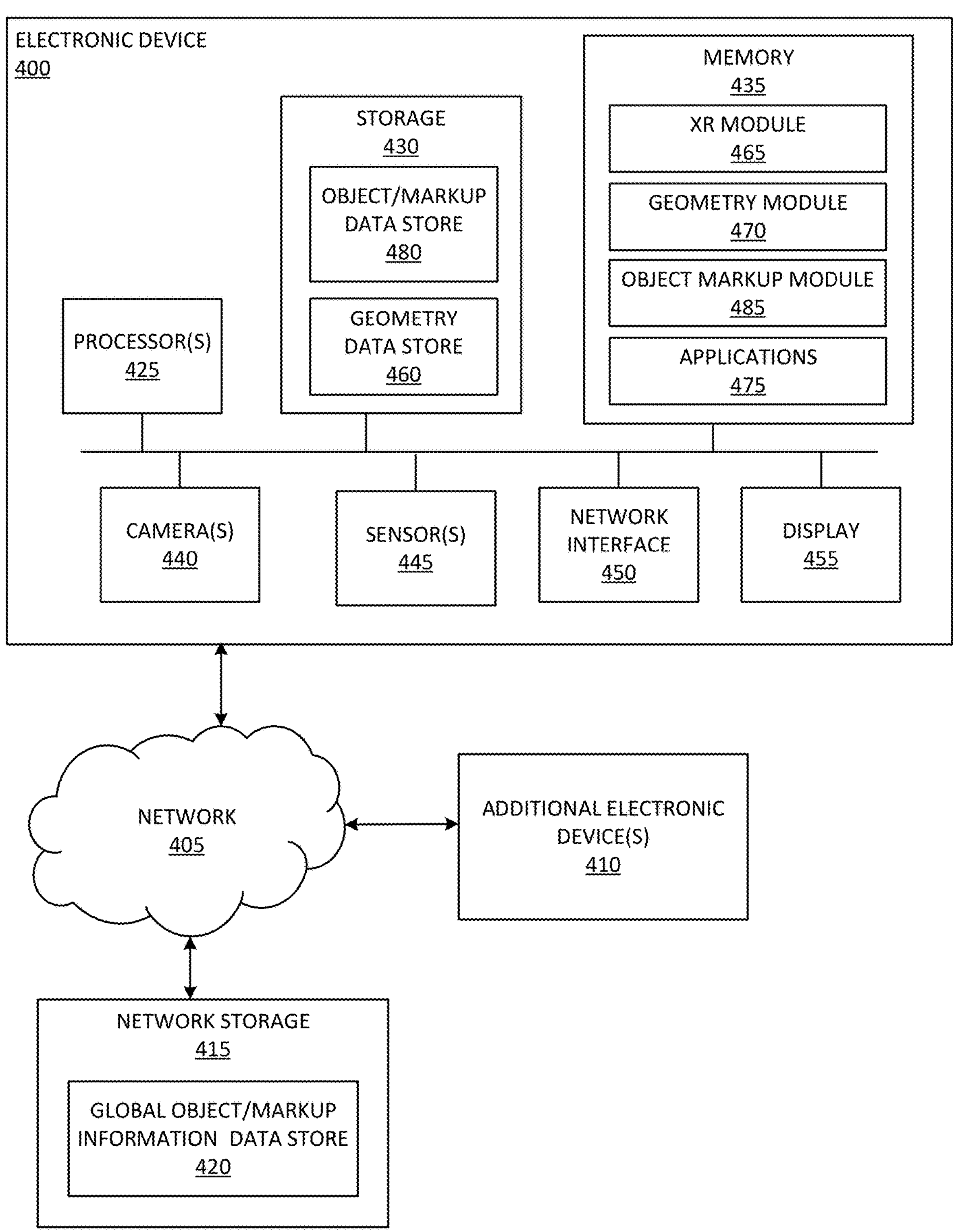
FIG. 4 shows, in block diagram form, a simplified system diagram according to one or more embodiments.

Referring now to FIG. 4, a simplified block diagram of an electronic device 400 is depicted, communicably connected to additional electronic devices 410 and a network storage 415 over a network 405, in accordance with one or more embodiments of the disclosure. Electronic device 400 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 400, additional electronic device 410, and/or network storage 415 may additionally, or alternatively, include one or more additional devices within which the various functionality may be contained, or across which the various functionality may be distributed, such as server devices, base stations, accessory devices, and the like. Illustrative networks, such as network 405 include, but are not limited to, a local network such as a universal serial bus (USB) network, an organization's local area network, and a wide area network such as the Internet. According to one or more embodiments, electronic device 400 is utilized to participate in a single user or multiuser communication session in an XR environment. It should be understood that the various components and functionality within electronic device 400, additional electronic device 410 and network storage 415 may be differently distributed across the devices, or they may be distributed across additional devices.

Electronic Device 400 may include one or more processors 425, such as a central processing unit (CPU). Processor(s) 425 may include a system-on-chip such as those found in mobile devices and include one or more dedicated graphics processing units (GPUs). Further, processor(s) 425 may include multiple processors of the same or different type. Electronic device 400 may also include a memory 435. Memory 435 may include one or more different types of memory, which may be used for performing device functions in conjunction with processor(s) 425. For example, memory 435 may include cache, ROM, RAM, or any kind of transitory or non-transitory computer readable storage medium capable of storing computer readable code. Memory 435 may store various programming modules for execution by processor(s) 425, including XR module 465, geometry module 470, 3D object markup module 485, and other various applications 475. Electronic device 400 may also include storage 430. Storage 430 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Electronic device may additionally include a network interface 450, from which the electronic device 400 can communicate across network 405.

Electronic device 400 may also include one or more cameras 440 or other sensors 445, such as depth sensor(s), from which depth or other characteristics of an environment may be determined. In one or more embodiments, each of the one or more cameras 440 may be a traditional RGB camera, or a depth camera. Further, cameras 440 may include a stereo- or other multi-camera system, a time-of-flight camera system, or the like. Electronic device 400 may also include a display device 455. The display device 455 may utilize digital light projection, OLEDs, LEDs, ULEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 430 may be utilized to store various data and structures which may be utilized for providing state information in order to manage geometry data for physical environments of a local user and/or a remote user. Storage 430 may include, for example, geometry data store 460. Geometry data store 460 may be utilized to store data related to one or more physical environments in which electronic device 400 participates, e.g., in a single user session or a multiuser communication session. For example, geometry data store 460 may store characteristics of a physical environment, which may affect available space for presentation of components during a single user or multiuser communication session. As another example, geometry data store 460 may store characteristics of a physical environment, which may affect how a user is able to move around or interact with the physical environment around the device. Storage 430 may further include, for example, 3D object/markup information data store 480. 3D object/markup information data store 480 may store characteristics of graphical information (e.g., 3Dobject information and/or corresponding markup information) that may be composited and rendered in an image frame containing a representation of all or part of the user's physical environment. Additionally, or alternatively, geometry data and 3D object/markup information data may be stored across network 405, such as by global geometry/3D object/markup information data store 420.

According to one or more embodiments, memory 435 may include one or more modules that comprise computer readable code executable by the processor(s) 425 to perform functions. The memory may include, for example, an XR module 465, which may be used to process information in an XR environment. The XR environment may be a computing environment which supports a single user experience by electronic device 400, as well as a shared, multiuser experience, e.g., involving collaboration with an additional electronic device(s) 410.

The memory 435 may also include a geometry module 470, for processing information regarding the characteristics of a physical environment, which may affect how a user moves around the environment or interacts with physical and/or virtual objects within the environment. The geometry module 470 may determine geometric characteristics of a physical environment, for example from sensor data collected by sensor(s) 445, or from pre-stored information, such as from geometry data store 460. Applications 475 may include, for example, computer applications that may be experienced in an XR environment by one or multiple devices, such as electronic device 400 and additional electronic device(s) 410. The 3D object markup module 485 may be used, e.g., for processing information regarding markups corresponding to 3D object models, including location and/or color, thickness, stroke information, stroke group information, stroke curve data, or other data characterizing the markup information, which may or may not be composited into an image frame depicting all or part of a user's physical environment)

Although electronic device 400 is depicted as comprising the numerous components described above, in one or more embodiments, the various components may be distributed across multiple devices. Accordingly, although certain processes are described herein, with respect to the particular systems as depicted, in one or more embodiments, the various processes may be performed differently, based on the differently-distributed functionality. Further, additional components may be used, some combination of the functionality of any of the components may be combined.

Exemplary Electronic Devices

Figure 5A:
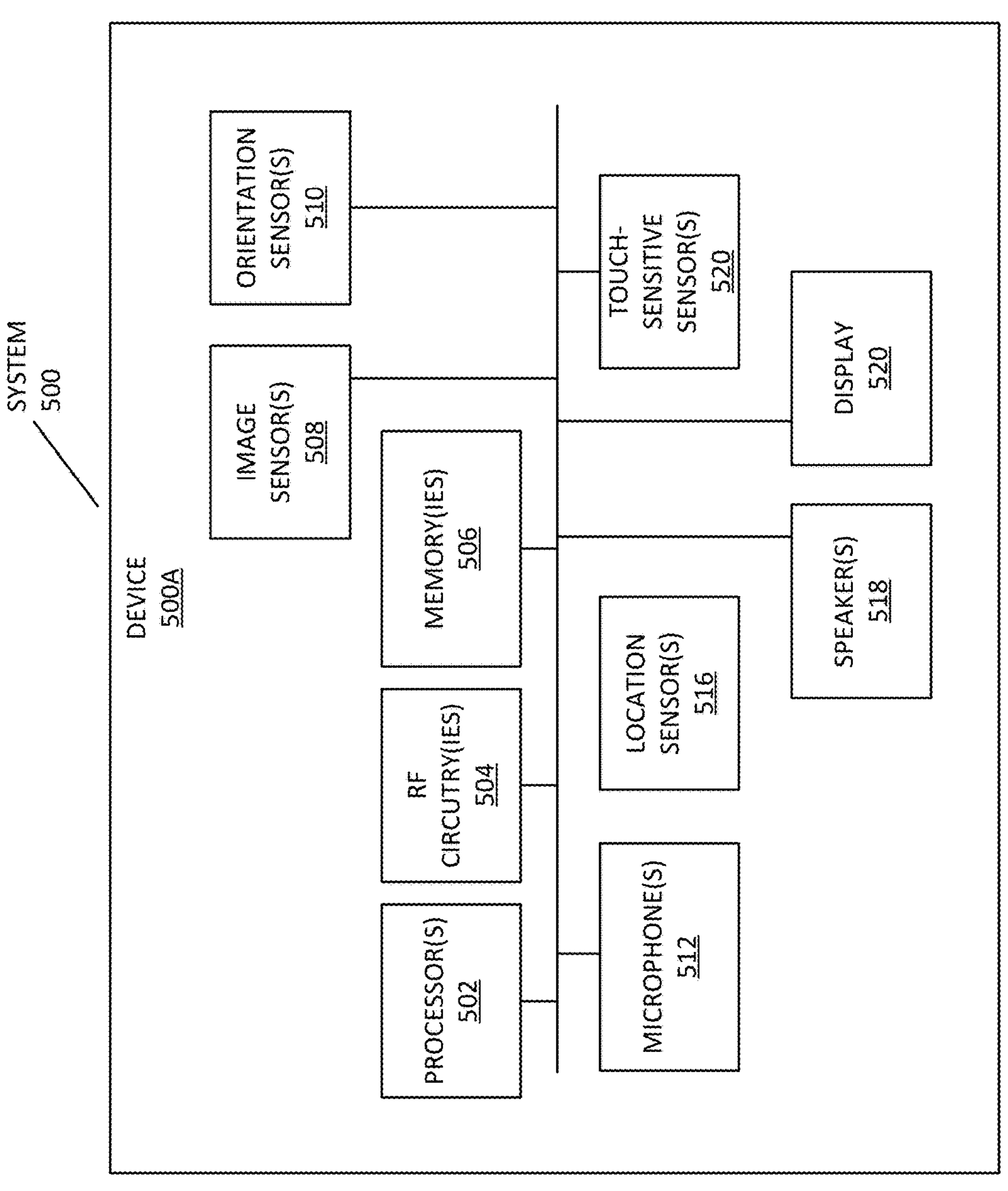
FIGS. 5A-5B show exemplary systems for use in various computer-simulated XR technologies.
Figure 5B:
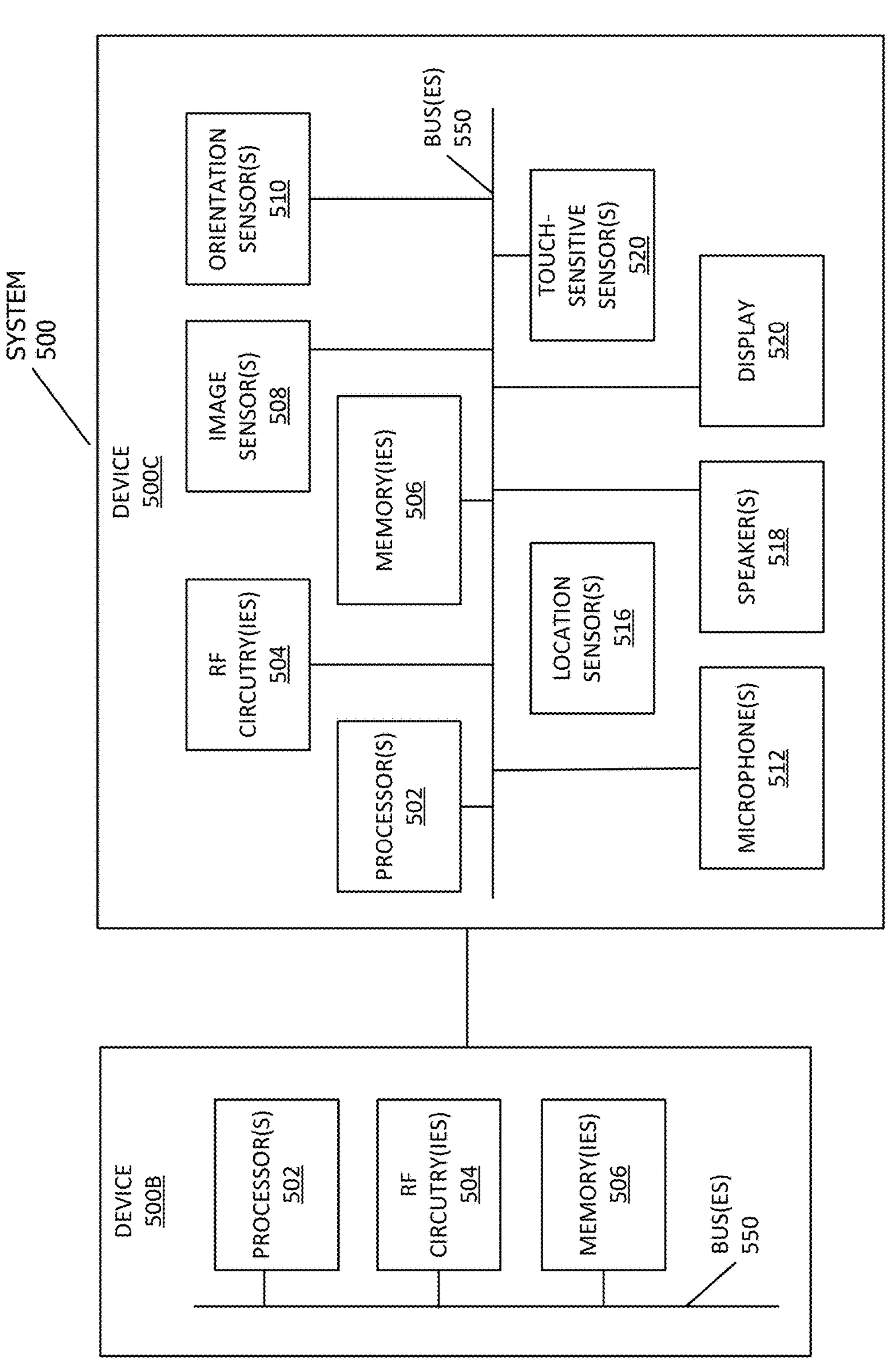

FIG. 5A and FIG. 5B depict exemplary system 500 for use in various extended reality (XR) technologies. In some examples, as illustrated in FIG. 5A, system 500 includes device 500A. Device 500A includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500A.

In some examples, elements of system 500 are implemented in a base station device (e.g., a computing device, such as a remote server, mobile device, or laptop) and other elements of system 500 are implemented in a second device (e.g., a head-mounted device). In some examples, device 500A is implemented in a base station device or a second device.

As illustrated in FIG. 5B, in some examples, system 500 includes two (or more) devices in communication, such as through a wired connection or a wireless connection. First device 500B (e.g., a base station device) includes processor(s) 502, RF circuitry(ies) 504, and memory(ies) 506. These components optionally communicate over communication bus(es) 550 of device 500C. Second device 500C (e.g., a head-mounted device) includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500C.

System 500 includes processor(s) 502 and memory(ies) 506. Processor(s) 502 include one or more general processors, one or more graphics processors, and/or one or more digital signal processors. In some examples, memory(ies) 506 are one or more non-transitory computer-readable storage mediums (e.g., flash memory, random access memory) that store computer-readable instructions configured to be executed by processor(s) 502 to perform the techniques described below.

System 500 includes RF circuitry(ies) 504. RF circuitry(ies) 504 optionally include circuitry for communicating with electronic devices, networks, such as the Internet, intranets, and/or a wireless network, such as cellular networks and wireless local area networks (LANs). RF circuitry(ies) 504 optionally includes circuitry for communicating using near-field communication and/or short-range communication, such as Bluetooth®.

System 500 includes display(s) 520. Display(s) 520 may have an opaque display. Display(s) 520 may have a transparent or semi-transparent display that may incorporate a substrate through which light representative of images is directed to an individual's eyes. Display(s) 520 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 520 include heads up displays, automotive windshields with the ability to display graphics, windows with the ability to display graphics, lenses with the ability to display graphics, tablets, smartphones, and desktop or laptop computers. Alternatively, system 500 may be designed to receive an external display (e.g., a smartphone). In some examples, system 500 is a projection-based system that uses retinal projection to project images onto an individual's retina or projects virtual objects into a physical setting (e.g., onto a physical surface or as a holograph).

In some examples, system 500 includes touch-sensitive sensor(s) 522 for receiving user inputs, such as tap inputs and swipe inputs. In some examples, display(s) 520 and touch-sensitive sensor(s) 522 form touch-sensitive display(s).

System 500 includes image sensor(s) 508. Image sensors(s) 508 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 508 also optionally include one or more event camera(s) configured to capture movement of physical elements in the physical setting. Image sensor(s) 508 also optionally include one or more depth sensor(s) configured to detect the distance of physical elements from system 500. In some examples, system 500 uses CCD sensors, event cameras, and depth sensors in combination to detect the physical setting around system 500. In some examples, image sensor(s) 508 include a first image sensor and a second image sensor. The first image sensor and the second image sensor are optionally configured to capture images of physical elements in the physical setting from two distinct perspectives. In some examples, system 500 uses image sensor(s) 508 to receive user inputs, such as hand gestures. In some examples, system 500 uses image sensor(s) 508 to detect the position and orientation of system 500 and/or display(s) 520 in the physical setting. For example, system 500 uses image sensor(s) 508 to track the position and orientation of display(s) 520 relative to one or more fixed elements in the physical setting.

In some examples, system 500 includes microphones(s) 512. System 500 uses microphone(s) 512 to detect sound from the user and/or the physical setting of the user. In some examples, microphone(s) 512 includes an array of microphones (including a plurality of microphones) that optionally operate in tandem, such as to identify ambient noise or to locate the source of sound in space of the physical setting.

System 500 includes orientation sensor(s) 510 for detecting orientation and/or movement of system 500 and/or display(s) 520. For example, system 500 uses orientation sensor(s) 510 to track changes in the position and/or orientation of system 500 and/or display(s) 520, such as with respect to physical elements in the physical setting. Orientation sensor(s) 510 optionally include one or more gyroscopes and/or one or more accelerometers.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-3 or the arrangement of elements shown in FIGS. 1, 4, and 5 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A three-dimensional (3D) object graphical markup method, comprising:

obtaining, at a first device, a 3D object file in a first file format specifying a 3D object;

displaying, at the first device, the 3D object;

receiving, from a user of the first device, an indication of a first markup at a first location corresponding to the 3D object;

displaying, at the first device, the first markup at the first location corresponding to the 3D object;

creating, at the first device, a 3D object markup file, wherein the 3D object markup file comprises a 3D object information portion and a markup information portion; and exporting the 3D object information portion and the markup information portion of the 3D object markup file to a second file format, wherein the 3D object information portion comprises information from the 3D object file specifying the 3D object, and wherein the markup information portion comprises information specifying one or more characteristics of the first markup and the first location.

2. The method of claim 1, wherein the 3D object markup file comprises a hierarchical file structure, and wherein the 3D object information is stored under a 3D object information node within the hierarchical file structure, and wherein the markup information is stored under a markup information node within the hierarchical file structure.

3. The method of claim 2, wherein the markup information portion further comprises a first group of strokes stored as a node under the markup information node in the 3D object markup file.

4. The method of claim 3, wherein the first group of strokes comprises two or more individual strokes, wherein each of the two or more individual strokes are stored as nodes under the first group of strokes node in the 3D object markup file.

5. The method of claim 1, further comprising:

receiving, from the user of the first device, an indication to toggle on or off the display of one or more markups specified by the markup information portion.

6. The method of claim 1, wherein the markup information portion comprises information encoding: one or more direct marks; and one or more indirect marks.

7. The method of claim 6, wherein the one or more direct marks are rendered to display with at least one different characteristic than the one or more indirect marks.

8. The method of claim 1, wherein the markup information portion further comprises metadata related to one or more of the markups corresponding to the 3D object.

9. The method of claim 8, wherein the metadata comprises one or more of the following: stroke shape, stroke thickness, stroke material, stroke style, line caps, or point thickness.

10. The method of claim 1, wherein the markup information further comprises information specifying one or more markups corresponding to the 3D object, and wherein each of the one or more markups comprises information specifying its location relative to a point on the 3D object.

11. The method of claim 1, wherein the second file format comprises a second digital content creation (DCC)-compatible file format, and wherein, once exported, the markup information will be viewable but no longer editable in the second DCC-compatible file format.

12. The method of claim 1, further comprising:

exporting, at a predetermined or specified time, only the markup information portion of the 3D object markup file to a second file; and transmitting the second file to a third party or a network location.

13. The method of claim 12, further comprising:

exporting, at a predetermined or specified time, only the 3D object information portion of the 3D object markup file to a third file; and transmitting the third file to a third party or a network location.

14. The method of claim 1, further comprising:

exporting, in response to an update to the markup information portion of the 3D object markup file, only the markup information portion of the 3D object markup file to a second file; and transmitting, in response to the exporting of the second file, the second file to a third party or a network location.

15. The method of claim 14, further comprising:

exporting, in response to an update to the 3D object information portion of the 3D object markup file, only the 3D object information portion of the 3D object markup file to a third file; and transmitting, in response to the exporting of the third file, the third file to a third party or a network location.

16. The method of claim 1, further comprising:

receiving, from the user of the first device, an indication of a second markup at a second location corresponding to the 3D object;

displaying, at the first device, the second markup at the second location corresponding to the 3D object; and updating the markup information portion of the 3D object markup file based, at least in part, on one or more characteristics of the second markup and the second location.

17. A non-transitory computer readable medium comprising computer readable code executable by one or more processors to:

obtain, at a first device, a 3D object file specifying a 3D object;

display, at the first device, the 3D object;

receive, from a user of the first device, an indication of a first markup at a first location corresponding to the 3D object;

display, at the first device, the first markup at the first location corresponding to the 3D object;

create, at the first device, a 3D object markup file, wherein the 3D object markup file comprises a 3D object information portion and a markup information portion; and export the 3D object information portion and the markup information portion of the 3D object markup file to a second file format, wherein the 3D object information portion comprises information from the 3D object file specifying the 3D object, and wherein the markup information portion comprises information specifying one or more characteristics of the first markup and the first location.

18. The non-transitory computer readable medium of claim 17, further comprising computer readable code executable by the one or more processors to:

receive, from the user of the first device, an indication of a second markup at a second location corresponding to the 3D object;

display, at the first device, the second markup at the second location corresponding to the 3D object; and update the markup information portion of the 3D object markup file based, at least in part, on one or more characteristics of the second markup and the second location.

19. A system, comprising:

a display device;

one or more processors; and one or more non-transitory computer readable media comprising computer readable code executable by the one of more processors to:

obtain a 3D object file specifying a 3D object;

display the 3D object on the display device;

receive, from a user, an indication of a first markup at a first location corresponding to the 3D object;

display, on the display device, the first markup at the first location corresponding to the 3D object;

create a 3D object markup file, wherein the 3D object markup file comprises a 3D object information portion and a markup information portion; and export the 3D object information portion and the markup information portion of the 3D object markup file to a second file format, wherein the 3D object information portion comprises information from the 3D object file specifying the 3D object, and wherein the markup information portion comprises information specifying one or more characteristics of the first markup and the first location.

20. The system of claim 19, wherein the 3D object markup file comprises a hierarchical file structure, and wherein the 3D object information is stored under a 3D object information node within the hierarchical file structure, and wherein the markup information is stored under a markup information node within the hierarchical file structure.

* * * * *